United States Patent [19]

Nagano

[11] Patent Number: 4,815,330

[45] Date of Patent: Mar. 28, 1989

[54] SPEED CHANGE OPERATING DEVICE FOR A BICYCLE

[75] Inventor: Masashi Nagano, Izumi, Japan

[73] Assignee: Shimano Industrial Company Limited, Osaka, Japan

[21] Appl. No.: 79,465

[22] Filed: Jul. 30, 1987

Related U.S. Application Data

[62] Division of Ser. No. 665,941, Oct. 29, 1984, Pat. No. 4,751,850.

[30] Foreign Application Priority Data

Apr. 3, 1984 [JP] Japan ................. 59-67162
Apr. 3, 1984 [JP] Japan ................. 59-67163
Jul. 25, 1984 [JP] Japan ................. 59-156222

[51] Int. Cl.⁴ .................................. G05G 9/00
[52] U.S. Cl. ......................... 74/475; 74/488; 74/489; 74/527; 74/531; 74/502.12; 74/523
[58] Field of Search ............. 74/531, 527, 489, 539, 74/540, 475, 501 B, 501 A, 523, 501 R; 192/48.1, 48.3; 280/289 H, 236; 474/82; 188/82.7

[56] References Cited

U.S. PATENT DOCUMENTS

| | | |
|---|---|---|
| 2,429,383 | 10/1947 | Arens . |
| 3,031,035 | 4/1962 | Tomita . |
| 3,180,166 | 4/1965 | Fox .................................. 74/527 X |
| 3,352,173 | 11/1967 | Freeland . |
| 3,406,587 | 10/1968 | Brilando et al. ................ 74/475 |
| 3,481,217 | 12/1969 | Maeda ............................. 74/489 |
| 3,595,351 | 7/1971 | Ishida ............................ 74/489 X |
| 3,662,618 | 5/1972 | Kroll et al. . |
| 3,915,029 | 10/1975 | Shimada . |
| 4,189,954 | 2/1980 | Nakamura et al. .......... 74/475 X |
| 4,232,564 | 11/1980 | Yamasaki . |
| 4,325,267 | 4/1982 | Kojima ......................... 74/475 X |
| 4,343,201 | 8/1982 | Shimano . |
| 4,440,040 | 4/1984 | Kittle et al. . |
| 4,454,784 | 6/1984 | Shimano ......................... 74/475 |
| 4,470,823 | 9/1984 | Shimano . |
| 4,504,250 | 3/1985 | Juy ............................... 74/475 X |
| 4,548,092 | 10/1985 | Strong, Jr. . |

FOREIGN PATENT DOCUMENTS

| | | |
|---|---|---|
| 0076589 | 4/1983 | European Pat. Off. . |
| 0084242 | 7/1983 | European Pat. Off. . |
| 0084243 | 7/1983 | European Pat. Off. . |
| 3200562 | 7/1983 | Fed. Rep. of Germany . |
| 511680 | 12/1920 | France .......................... 74/502.2 |
| 511681 | 12/1920 | France .......................... 74/502.2 |
| 1352030 | of 1964 | France . |
| 49-24829 | 7/1974 | Japan . |
| 59-127127 | 7/1984 | Japan ........................... 74/501 R |
| 275059 | 7/1951 | Switzerland ................... 74/531 |
| 2025003 | 1/1980 | United Kingdom . |

Primary Examiner—Gary L. Smith
Assistant Examiner—Rodney M. Lindsey
Attorney, Agent, or Firm—Stevens, Davis, Miller & Mosher

[57] ABSTRACT

A speed-change operating device for a bicycle includes an operating lever for actuating a derailleur, the operating lever being supported rotatably through a lever shaft to a base member attached to the bicycle frame. A friction mechanism applies to the lever an adjustable rotational resistance against a bias force of a return spring associated with the derailleur. A positioning mechanism includes a positioning member having a plurality of engaging portions for precisely setting the respective speed change stages of the derailleur and an engaging member engageable with at least one of the engaging portions. An operating mechanism selects between an operating mode and a non-operating mode of the positioning mechanism so that the positioning mechanism can be placed in a non-operating mode, when desired, with the speed-change operation being performed in such non-operating mode only with the friction mechanism resisting the return spring.

5 Claims, 12 Drawing Sheets

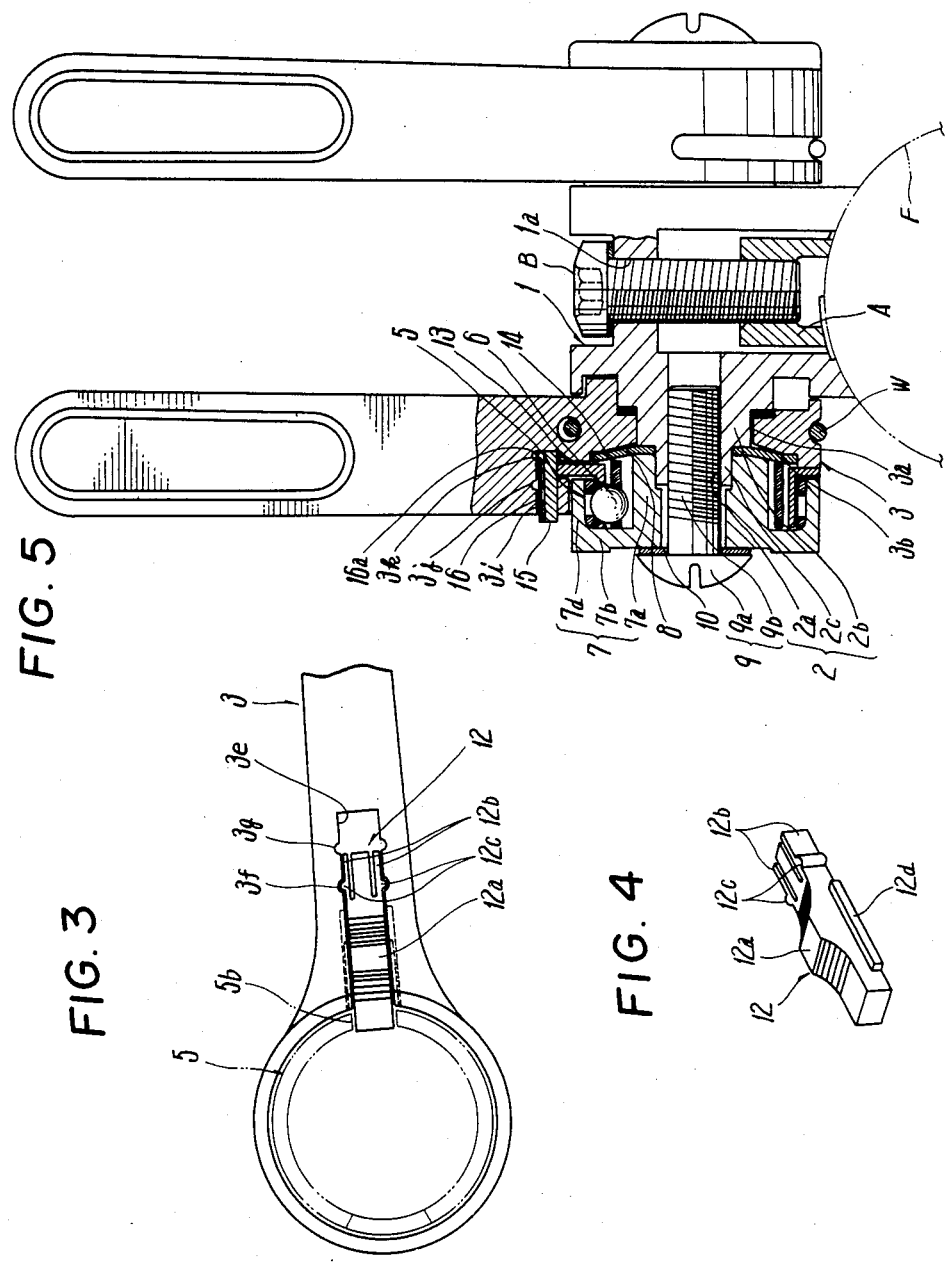

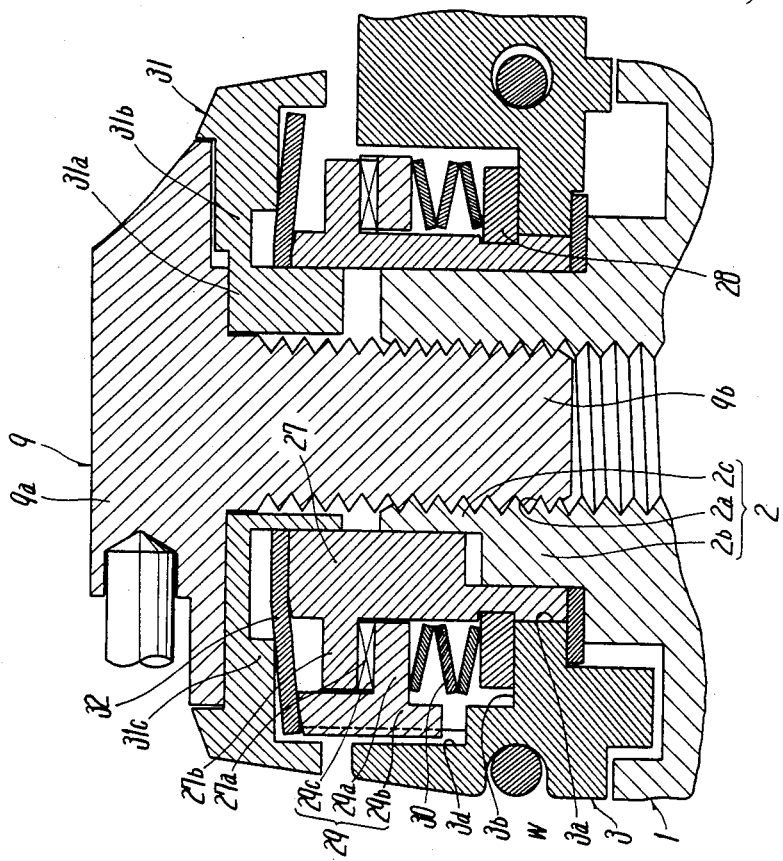

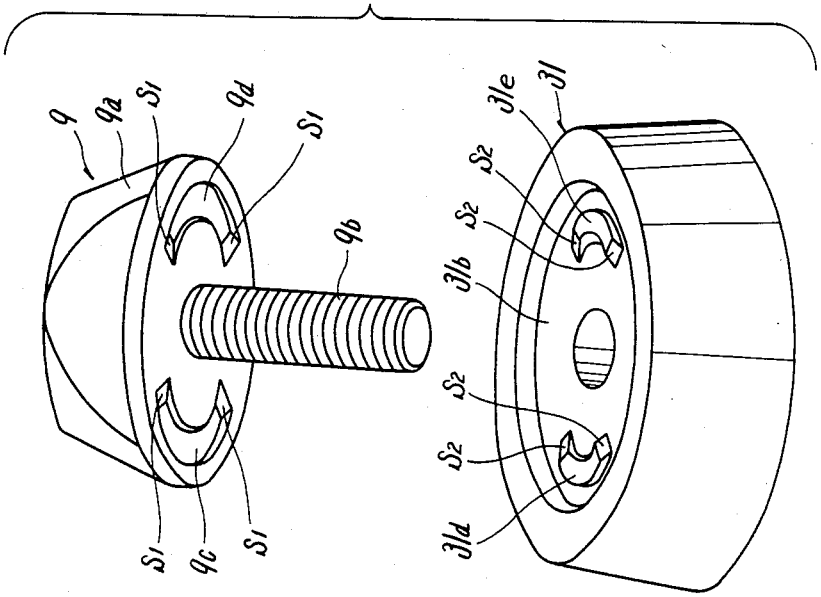
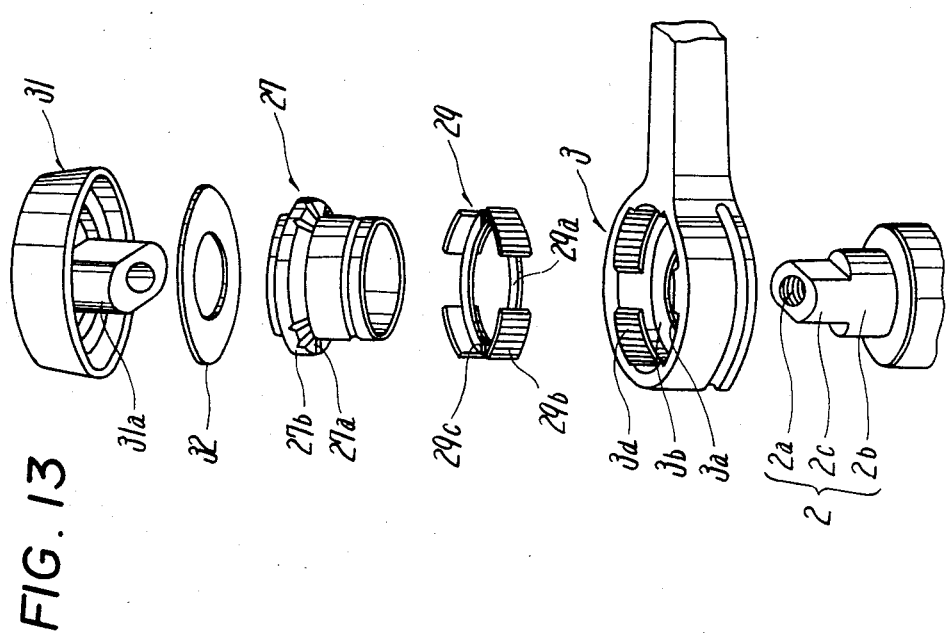

SPEED CHANGE OPERATING DEVICE FOR A BICYCLE

This is a division of application Ser. No. 665,941, filed Oct. 29, 1984, now U.S. Pat. No. 4,751,850.

FIELD OF THE INVENTION

This invention relates to a speed-change operating device for a bicycle, and more particularly to a speed change operating device provided with a base member having a lever shaft and mounted to a frame or a handle, such as a top tube, of the bicycle, and operating levers supported rotatably to the lever shaft for actuating a derailleur associated with the bicycle.

BACKGROUND OF THE INVENTION

Generally, the above type speed change operating device is required to turn the operating lever to a proper position corresponding to a desired speed change stage of a derailleur. In this case, it is difficult for the speed-change operating device having a friction mechanism for applying to the lever a resistance overcoming a spring force of a return spring at the derailleur to operate the lever to move it to the proper position. Hence, the lever usually is over-shifted and a cyclist becomes aware by sensing with his leg during pedalling whether engagement of the driving chain with the desired sprocket has been accomplished and if not, he then returns the lever to an extent of the over shift.

Such operation, however, requires not only skill on the part of the cyclist, but also tend to result in nervous control of the lever. Also, the time of operating the lever from a start of the speed change to a release of the lever after restoring the overshift is quite long. In other words, the time during which the cyclist is unable to devote his full attention on steering the bicycle, but rather on the speed change, will increase, thereby creating a time loss, which becomes especially critical in e.g., a road race.

To solve the above problem, a speed-change operating device has been proposed which is provided with a positioning mechanism comprising a positioning member having engaging portions corresponding to the respective speed change stages at the derailleur and an engaging member engageable with each engaging portion, so that the operating lever is operable always properly to the position corresponding to the desired speed change stage.

The operating lever, when the above positioning mechanism is assembled with the speed-change operating device, is operated only to switch the engaging member to one engaging portion to thereby ensure the engagement of the driving chain with the desired sprocket to reduce the operating time of the lever and to enable the cyclist to be free from the nerve racking overshift operation and to concentrate his attention only on driving and steering the bicycle.

The positioning mechanism, however, is not usable without modification when the combination of the tooth number of the sprockets and the intervals therebetween change, because an operating wire connecting the speed-change operating device and the derailleur should be adjusted in length to mate the position set by the positioning mechanism with the speed change stage at the derailleur and also a similar adjustment is required when the wire is elongated.

For the usual bicycle, the position adjustment need only be carried out, but for bicycles used for road racing, the bicycle wheel itself is required to be exchanged during the race. In a case where a multistage sprocket assembly attached to the wheel is changed when the wheel is exchanged (in other words, the speed change stage of the derailleur does not mate with each sprocket) the position adjustment is required, which takes much time, resulting in a time delay in the race. As a result, the above type of speed change operating device having the positioning mechanism has been unusable in connection with racing bicycles.

SUMMARY OF THE INVENTION

An object of the invention is to provide a speed-change operating device which is provided with a friction mechanism, a positioning mechanism and an operating mechanism for selecting between an operation and a non-operation mode for positioning of the lever by a positioning member and an engaging member at the positioning mechanism, i.e., in the non-operation mode, the positioning member and the engaging member are rendered non-operative in positioning the lever. Thus, during the operation mode, the positioning mechanism is used to efficiently change the bicycle speed, while the friction mechanism is usable for changing the speed when the positioning mechanism is in the nonoperation mode and hence is not usable, whereby the aforesaid conventional problem is expected to be solved.

This invention is characterized in that it comprises a friction mechanism which gives to the operating lever a rotational resistance against a bias force of a return spring at the derailleur and which is adjustable of this rotational resistance, a positioning mechanism comprising a positioning member having a plurality of engaging portions for setting the speed change stages at the derailleur respectively and an engaging member engageable with at least one of the engaging portions, and an operating mechanism for selecting an operation and a non-operation mode for positioning the lever by means of engagement of the engaging member with the positioning member. Thus, although the positioning mechanism is used with priority, the friction mechanism is operable to change the speed by making a required position adjustment when the positioning mechanism is in the non-operation mode and thus does not function.

Incidentally, although the positioning mechanism is controlled by the operating mechanism to be actuated or not, the friction mechanism need not be particularly switched to be actuated or not. In other words, even when the friction mechanism is in the actuated condition, the positioning mechanism may be actuated, i.e., in the operation mode.

In a first embodiment of the invention the operating mechanism selects the operation or non-operation mode for positioning the lever by the positioning mechanism, and the friction mechanism is adapted to be always actuated. In a second embodiment of the invention, only one of the positioning mechanism is selected and friction mechanism, and only the selected mechanism is usable.

In the first embodiment, the positioning mechanism is selected to be in the operation or non-operation mode according to means wherein one of the positioning member and the engaging member at the positioning mechanism is adapted to engage with or disengage from one of the operating lever and the base member, and that wherein one of the positioning member and the engaging member, or a holding member therefor, is made displaceable toward the engaging position and disengaging position with respect to the other, so that such displacement toward the disengaging position controls the positioning mechanism to place it in the non-operation mode. In the second embodiment, the positioning mechanism or the friction mechanism is selected mainly by using an adjusting screw member screwable with a lever shaft to adjust a rotational resistance caused by the friction mechanism.

In any case, the positioning mechanism is selected in its operating mode of condition by the operating mechanism, thereby changing the bicycle speed simply, quickly and accurately by use of the positioning mechanism which has good speed change efficiency. Also, in a case where a sprocket assembly different in combination does not function unless the operating wire i adjusted in length, the friction mechanism is usable to change the bicycle speed, especially when the present invention is applied to a road-racing bicycle, thus avoiding delays caused by adjusting the length of the control wire.

These and other objects of the invention will become more apparent in the detailed description and examples which follow.

BRIEF DESCRIPTION OF THE DRAWINGS

FIG. 3 is a plan view of an operating mechanism of the same, FIG. 4 is a perspective view of a clutch member of the same, FIG. 5 is a sectional view of a second embodiment of the invention, FIG. 11 is a perspective exploded view of the fifth embodiment, FIG. 12 is a sectional view of the principal portion only of a sixth embodiment of the invention, FIG. 13 is a perspective exploded view of the sixth embodiment, FIG. 14 is a perspective view showing a relationship between a cap and an adjusting screw member in the sixth embodiment.

DETAILED DESCRIPTION OF THE INVENTION

Figure 1:
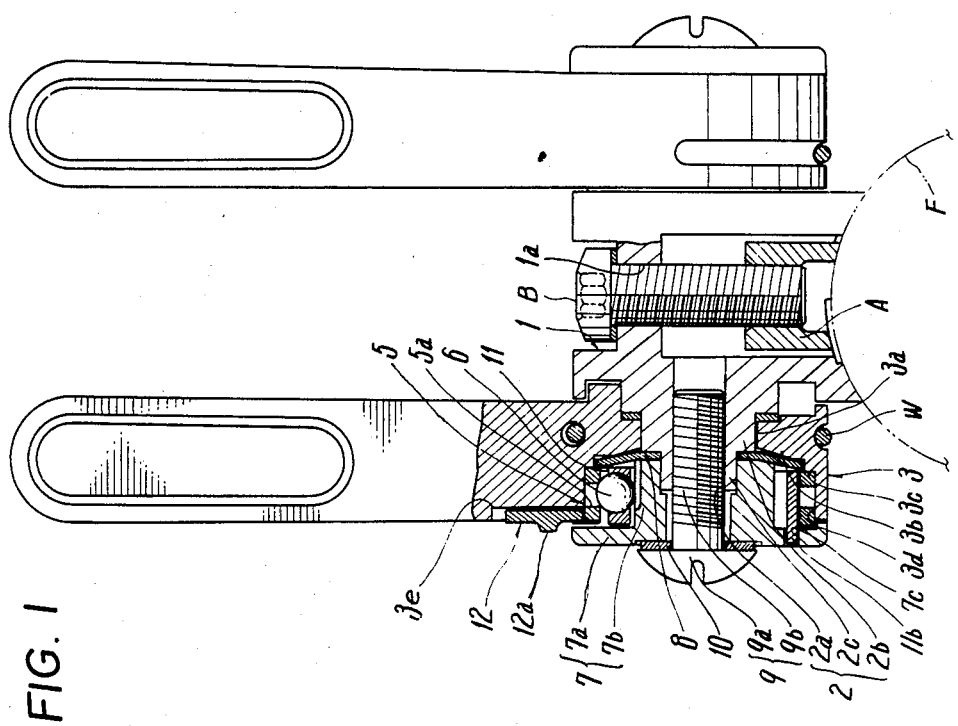
FIG. 1 is a sectional view of a first embodiment of a speed change operating device of the invention.

A speed change operating device shown in FIG. 1 is of a double lever type. An operating lever 3 is rotatably supported through a lever shaft 2 to a base member 1 which is fixed to, for example, a top tube at the bicycle frame F, the operating lever 3 at the left side in FIG. 1 being operated to actuate a rear derailleur (not shown) through a control wire W.

The speed change operating device of the invention basically comprises a friction mechanism for applying to the operating lever 3 a rotational resistance against a a bias force of a return spring at the rear derailleur. The rotational resistance applied by the friction mechanism is made adjustable. The speed change device also comprises a positioning mechanism for the operating lever 3, which comprises a positioning member 5 having a plurality of engaging portions 5a for setting the speed change stages of the rear derailleur respectively and an engaging member 6 engageable with at least one of the engaging portions 5a; and an operating mechanism which selects an operation or a non-operation mode for the positioning mechanism which positions lever 3 by use of the positioning member 5 and engaging member 6.

Referring to FIGS. 1 through 4, a first embodiment of the speed change operating device of the invention is shown, in which the base member 1 is provided at the center with a mounting bore 1a, and at the lateral side with the tubular lever shaft 2 having at the center a threaded bore 2a and projecting perpendicularly to the axis of mounting bore 1a. Base member 1 is fixed to the frame F by a fixing means comprising a mounting screw B screwable with the mounting bore 1a and a base A welded to the frame F and having a threaded bore. Alternatively, the base member 1 may be fixed to the frame F by use of a tightening band or the like.

A round shaft portion 2b and a not-round shaft portion 2c are provided at the outer periphery of lever shaft 2, the round shaft portion 2b rotatably carrying the operating lever 3, the not-round shaft portion 2c not-rotatably carrying a cap 7 comprising a cylinder 7a and a flange 7b at one axial end thereof. Alternatively, the lever shaft 2 may be separate from the base member 1 and mounted not-rotatably with respect thereto.

The operating lever 3 has a boss, and is fitted through a shaft bore 3a at the center of the boss rotatably onto the round shaft portion 2b. A round recess 3d is provided through a receiving surface 3b extending radially outwardly from one end of shaft bore 3a. Operating lever 3 also includes an annular recess 3d in connection of the receiving surface 3b through a stepped portion 3c. The positioning mechanism is interposed between the recess 3d and the cylinder 7b at the cap 7, and the friction mechanism between the end face of cylinder 7b and the receiving surface 3b.

The friction mechanism is so constructed that a friction plate 8, which has a frictional portion of size to match with the receiving surface 3b at the lever 3, is fitted not-rotatably and axially movably onto the not-round shaft portion 2c at the lever shaft 2. An adjusting screw bolt 9, comprising a head 9a in contact with the external end face of cap 7 to give it an axial pressure and a threaded shank 9b axially movably screwable with the threaded bore 2a at the lever shaft 2, screws with the bore 2a through a washer 10 to adjust an urging force applied to the friction plate 8 against the receiving surface 3b to thereby apply to the operating lever 3 a rotational resistance against the bias of the return spring at the derailleur with respect to the base member 1 and to adjust this resistance.

Figure 2:
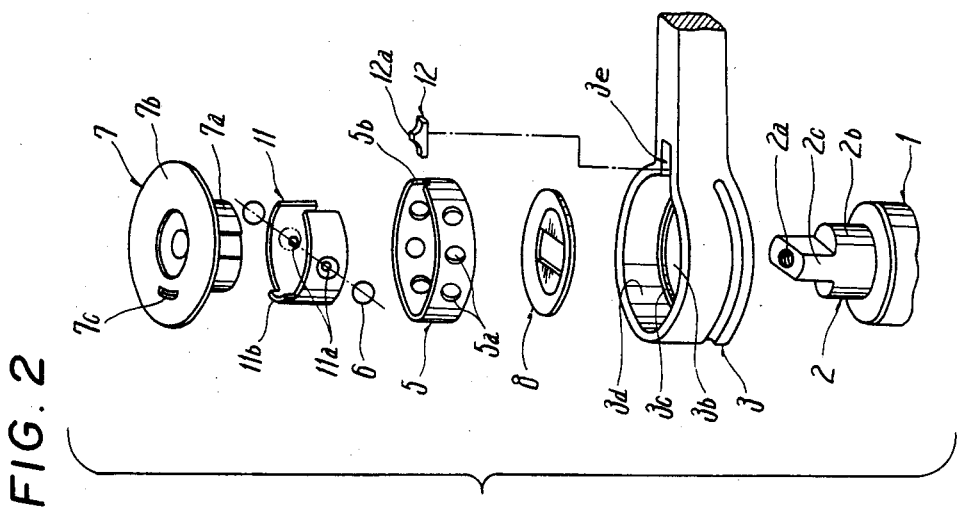
FIG. 2 is a perspective exploded view of the principal portion of the first embodiment.

The positioning mechanism employs spherical engaging members 6 and a holding member 11 for holding the engaging members 6 and biasing them to the engaging portions 5a at the positioning member 5. The positioning member 5, as shown in FIG. 2, is cylindrical, and is fitted into the recess 3d at the operating lever 3 and placed on the shoulder 3e thereof in relation of being rotatable relative to the inner surface of the recess 3d. Positioning member 5 is provided at one circumferential side with a cutout 5b with respect to the operating mechanism and at both the circumferential sides of cutout 5b with engaging bores 5a for setting to the speed change stages of the derailleur respectively.

The holding member 11 for the engaging members 6 is formed in a circular arc and has at an intermediate portion thereof a retainer 11b to be retained into a bore 7c formed at the flange 7b at the cap 7 and at both circumferential sides of retainer 11b a pair of holding portions 11a for holding and biasing the engaging members 6 always radially outwardly.

In the positioning mechanism, the holding member 11 holding the engaging members 6 in the engaging portions 11a respectively is contracted in diameter and inserted into the positioning member 5 so that the engaging members 6, when the positioning member 5 rotates relative to the holding member 11, are adapted to engage successively with the engaging portions 5a. The positioning member 5 including the holding member 11 in assembly therewith, when inserted into the recess 3d and placed on the shoulder 3c, disposes the cutout 5b at the lever grip side and the retainer 11b at the holding member 11 is retained to the retaining bore 7c at the cap 7, thereby keeping the holding member 11 not rotatable with respect to the base member 1.

The operating mechanism for selecting operation and non-operation modes of the positioning mechanism incorporated in the recess 3d, as shown in FIGS. 1, 3 and 4, comprises a guide groove 3e formed at one side surface of operating lever 3 and extending toward the utmost end thereof, a clutch member 12 fitted into the guide groove 3e in relation of being engageable with or disengageable from the cutout 5b at the positioning member 5, and a control 12a projecting outwardly from the guide groove 3e, so that the control 12a is operated to allow the positioning member 5 to engage with or disengage from the operating lever 3.

The guide groove 3e, as shown in FIGS. 3 and 4, is provided at the opposite side walls with recesses 3f and 3g which are spaced at regular intervals. The clutch member 12 is provided at both sides of one lengthwise end directed to the utmost end of lever 3 with elastic segments 12b which have at the outsides thereof projections 12c projecting outwardly and are biased to engage with the recesses 3f or 3g respectively, thereby being held in the engaging position with the cutout 5b or in the disengaging position therefrom, depending upon with which recess 3f or 3g projections 12c are in engagement.

Also, the guide groove 3e has at both side surfaces and at the lowermost portions thereof recesses extending lengthwise of the groove 3e and the clutch member 12 has at both its side surfaces and the lowermost portions thereof elongate projections 12d projecting outwardly and extending lengthwise of clutch member 12 and engageable with the lengthwise recesses at the guide groove 5e, thereby forming a holding means for preventing the clutch member 12 from escaping from the groove 3e.

Now, in the abovementioned construction, the friction mechanism and positioning mechanism are independently operated to be switched to the operation or non-operation mode. In detail, the adjusting screw bolt 9 is rotated to switch the friction mechanism to its operating condition for applying a rotational resistance adjustably to the operating lever 3 against the bias of the return spring at the derailleur and to its not-operating condition for applying no rotational resistance against said return spring. The clutch member 12 is operated along the groove 3e to engage with or disengage from the cutout 5b at the positioning member 5, whereby the operating lever 3 is switched to its operating condition to be positioned for setting the speed change stage of the derailleur and to its not-operating condition.

Thus, when the friction mechanism only is actuated, the operating lever 3 somewhat overshifts the position corresponding to the desired speed change stage and then return to the position, thereby switching the derailleur.

When the positioning mechanism for the operating lever 3 only is actuated, the operating lever 3 is operable to the desired speed change position always with accuracy, whereby there is no need of overshifting. Hence, the cyclist, even when not particularly skilled, can complete the speed change simply, quickly and not-nervously.

In a case where the speed change operating device of the invention constructed as foregoing is applied to a road-race bicycle, the positioning mechanism is actuated preferably to change the bicycle speed simply and quickly. Also, when the wheel is exchanged during the racing so that the multistage sprocket assembly changes in gear combination such that it no longer matches the positioning mechanism with the respective speed change stages at the rear derailleur, the clutch member 12 only is operated to make the positioning mechanism not-operable even without adjusting the speed change positions. At this time, the adjusting screw bolt 9 is previously controlled to apply a predetermined rotational resistance to the lever 3, so that, when the positioning mechanism is switched to the non-operating mode, the friction mechanism is usable without operating the adjusting screw bolt 9. Hence, the use of the friction mechanism allows the cyclist to continue the race without troublesome adjustment of the speed change positions as discussed above.

In addition, the friction mechanism may be actuated even when the positioning mechanism is kept in operating mode or condition.

In this case, the positioning mechanism further ensures its operation. Accordingly, even when the positioning mechanism is switched to the non-operating mode, there is no need to operate the adjusting screw bolt 9 to actuate the friction mechanism. Especially, when the positioning mechanism is switched not to be actuated for exchanging the wheel during the road racing, the adjusting screw bolt 9 need not be used for the friction adjustment.

Next, explanation will be given on a second embodiment shown in FIGS. 5 and 6. The second embodiment is different from the first embodiment in that the engaging members 6 are rotated together with the lever 3 or independently thereof, by a clutch member, thereby selecting the operation or the non-operation mode of the positioning mechanism. More particularly at the flange 7b at the cap 7 in the first embodiment is formed an outer cylinder 7d larger in diameter than the cylinder 7a, the cylindrical positioning member 5 is fixed to the inner surface of outer cylinder 7d, and a holding member 13 for holding the engaging members 6 is interposed between the outer cylinder 7d and the inner cylinder 7a, so that the holding member 13 is adapted to engage with or disengage from the operating lever 3.

Figure 6:
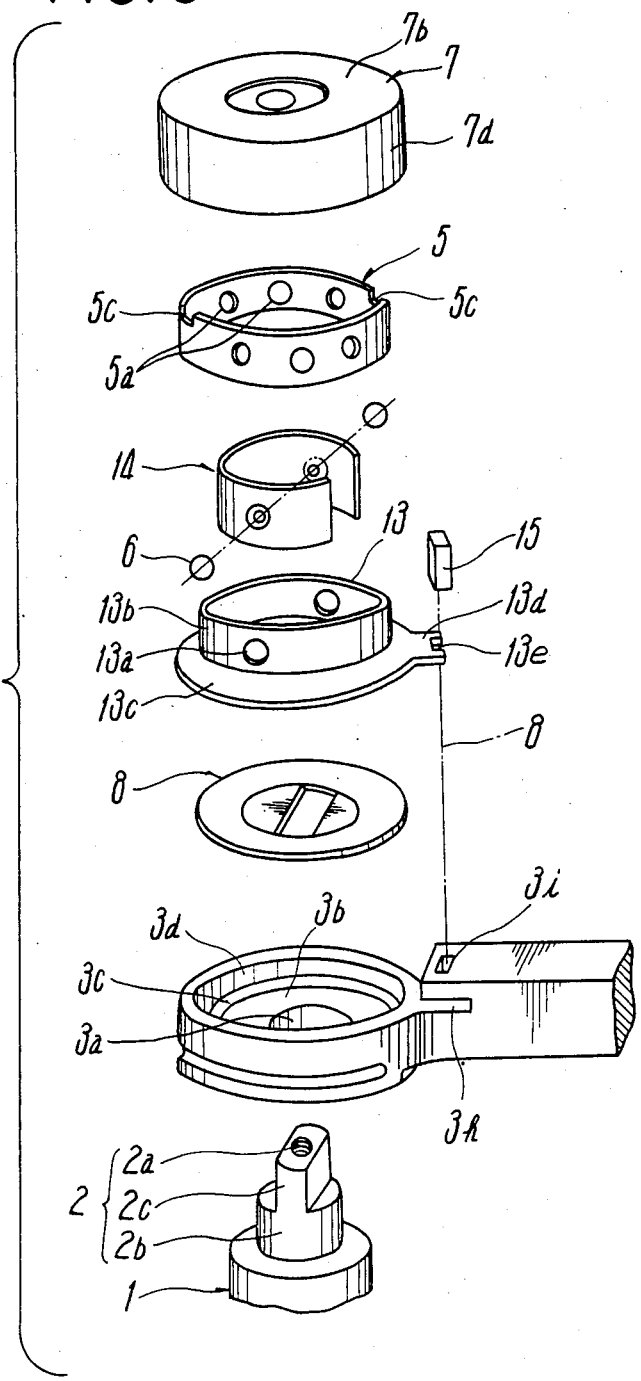
FIG. 6 is a perspective exploded view of the principal portion of the second embodiment.

In addition, the positioning member 5, as shown in FIG. 6, is provided with cutouts 5c, which engage with projections (not shown) provided at the outer cylinder 7d, thereby fixing the positioning member 5 to the outer cylinder 7d.

The holding member 13, as shown in FIG. 6, uses a spring cylinder 14 for biasing the engaging members 6 toward the positioning member 5, and comprises a cylinder 13b having holding bores 13a receiving therein the engaging members 6 respectively, a flange 13c, and an engaging nose 13d projecting radially outwardly from the flange 13c. Flange 13c is interposed and supported between the axial end face of outer cylinder 7d and the outer surface of the boss at the lever 3; the engaging nose 13d is fitted into a recess 3h formed at the lever 3, so that an engaging cutout 13e provided at the engaging nose 13d, a guide bore 3i communicating with the recess 3h, and a clutch member 15 mounted swingably into the guide bore 3i, constitute the operating mechanism.

The clutch member 15 is basically the same in operating manner as the clutch member 12 in the first embodiment, but different therefrom in the operating direction. Referring again to FIG. 5, a leaf spring 16 having at the utmost end a projection 16a is provided lengthwise of clutch member 15 and at one wall surface of guide bore 3i are provided recesses 3j and 3k each engageable with the projection 16a with the clutch member 15 engages with or disengages from the cutout 13e, thereby holding the clutch member 15 in the bore 3i.

Figure 7:
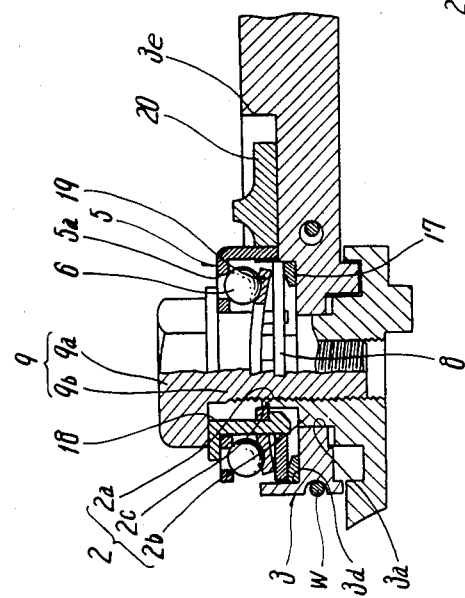
FIG. 7 is a longitudinal sectional view of a third embodiment of the invention.

Next, explanation will be given on a third embodiment of the invention shown in FIG. 7.

The third embodiment, the same as the first embodiment, is adapted to allow a clutch member 26 to engage with or disengage from the positioning member 5, but different in that the engaging members 6 engage with or disengage from the same axially of the operating lever 3. In addition, in FIG. 7, the components basically the same as those in the first embodiment are designated by the same reference numerals.

In detail, at one side of the boss of operating lever 3 is provided a round recess 3d in continuation of the shaft bore 3a, a friction plate 8 is inserted into the recess 3d through a washer 17, a mounting cylinder 18 instead of the cap used in the first embodiment is disposed around the threaded shank 9b at the screw bolt 9, and a positioning member 5 and a holding member 19 comprising a spring plate for holding the engaging members 6, are disposed around the mounting cylinder 18 and between the head 9a of screw bolt 9 and the friction plate 8, so that the holding member 19 and engaging members 6 held thereto are assembled as a unit through the mounting cylinder 18 with respect to the positioning member 5.

The positioning member 5 provides an engaging segment 5d extending toward the lever 3, and a guide recess 3e, the same as in the first embodiment, is provided at the lever 3, so that a clutch member 20 is supported movably into the guide recess 3e.

Alternatively, the positioning member 5 or the engaging members 6, may be made displaceable radially or axially by use of an operating member.

Figure 8:
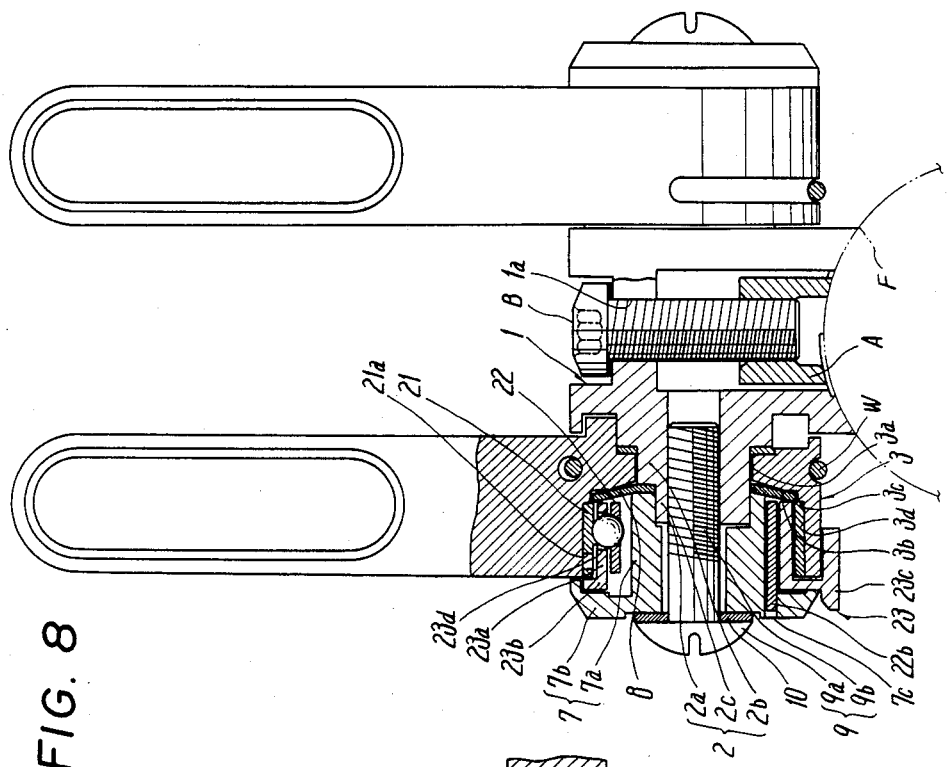
FIG. 8 is a sectional view of a fourth embodiment of the invention.

Next, explanation will be given on a fourth embodiment applied with the above idea and shown in FIGS. 8 and 9.

The fourth embodiment is basically the same as the first embodiment. A positioning member 21, which is cylindrical and has a plurality of engaging portions 21a, is fitted into a round recess 3d at the boss of operating lever 3 not-rotatably relative to the recess 3d, a cylindrical holding member 22 having holding portions 22a for the engaging members 6 is fitted into a positioning member 21 and fixed to the cap 7, and an operating member 23 is interposed between the positioning member 21 and the holding member 22.

Figure 9:
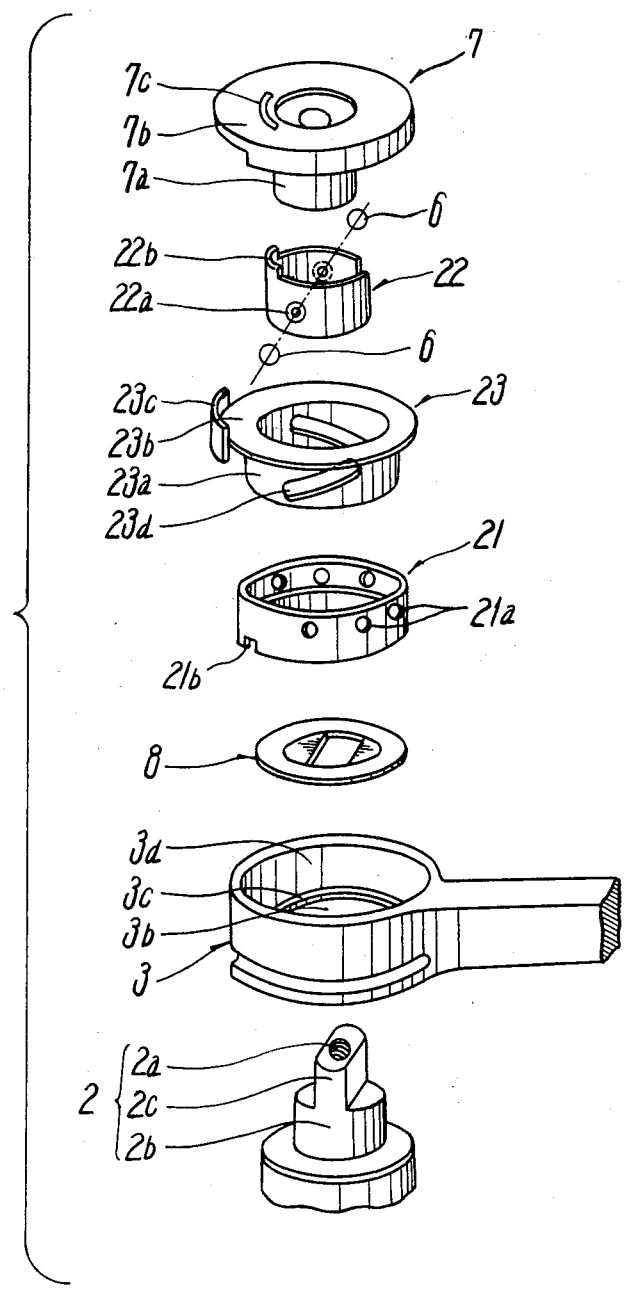
FIG. 9 is a perspective exploded view of a principal portion of the fourth embodiment.

The operating member 23, as shown in FIG. 9, comprises a cylinder 23a interposed rotatably between the holding member 22 and the positioning member 21, a flange 23b formed at one axial end of cylinder 23a and interposed rotatably and not axially movably between the flange 7b at the cap 7 and the surface of the boss of lever 3 opposite thereto, and an operating segment 23c mounted at one side of flange 23b. The cylinder 23a is provided with control bores 23d extending circumferentially and slanting axially of operating member 23, so that the operating member 23 rotates to switch the engaging members 6 to the engaging or disengaging position with respect to the positioning member 21 through the bores 23d.

The positioning member 21 is provided with a cutout 21b, with which an engaging projection (not shown) at the lever 3 engages to be fixed to the lever 3. The holding member 22 is provided with a nose 22b, which is fitted into a bore 7c at the cap 7, thereby being fixed to the cap 7.

In the abovementioned construction, the adjusting screw bolt 9 is rotated to push the friction plate 8 so that the friction mechanism can be switched to a mode where the lever 3 is given an adjustment rotational resistance against the return spring at the derailleur and mode where the same is given no rotational resistance. The segment 23c at the operating mechanism 23 is operated to shift through the control bores 23d the engaging members 6 from engaging positions thereof with the positioning member 22 to disengaging positions therefrom, thereby enabling the operating lever 3 to be switched from the operating condition of positioning the rear derailleur in the respective speed change stages to the not-operating position.

Also, the friction mechanism and positioning mechanism in the first through fourth embodiments may be selected in an alternative way.

Next, explanation will be given on a fifth embodiment applied with the above idea, in accordance with FIGS. 10 and 11.

The fifth embodiment is basically the same in construction as the fourth embodiment, but different in that an operating member 24c is integral with a cap 24, an adjusting screw bolt 9 screws forward to move the cap 24 axially of the lever shaft 2 and to shift a holding member 26 for the engaging members 6, and the cap 24 brings a friction plate 8 in press contact with the boss of lever 3, thereby actuating the friction mechanism.

The cap 24, the same as those in the aforesaid embodiments, has a cylinder 24a and a flange or lid 24b, and the operating member 24c is integral therewith.

The positioning mechanism comprises a cylindrical positioning member 25 to be fitted into the recess 3d at the lever 3 not-rotatably relative thereto, a holding member 26 formed of an elastic cylinder of a C-like-shape in section, and engaging members 6 held into holding recesses 26a at the holding member 26, the holding member 26 being fixed to the cap 24 in relation of being elastically displaceable with respect thereto.

Incidentally, the positioning member 25 is fixed to the lever 3 through engagement of a cutout 25b with a projection (not shown) at the lever 3, and the holding member 26 is fixed to the cap 24 through engagement of a retainer 26b with a bore 24e at the cap 24.

Figure 10:
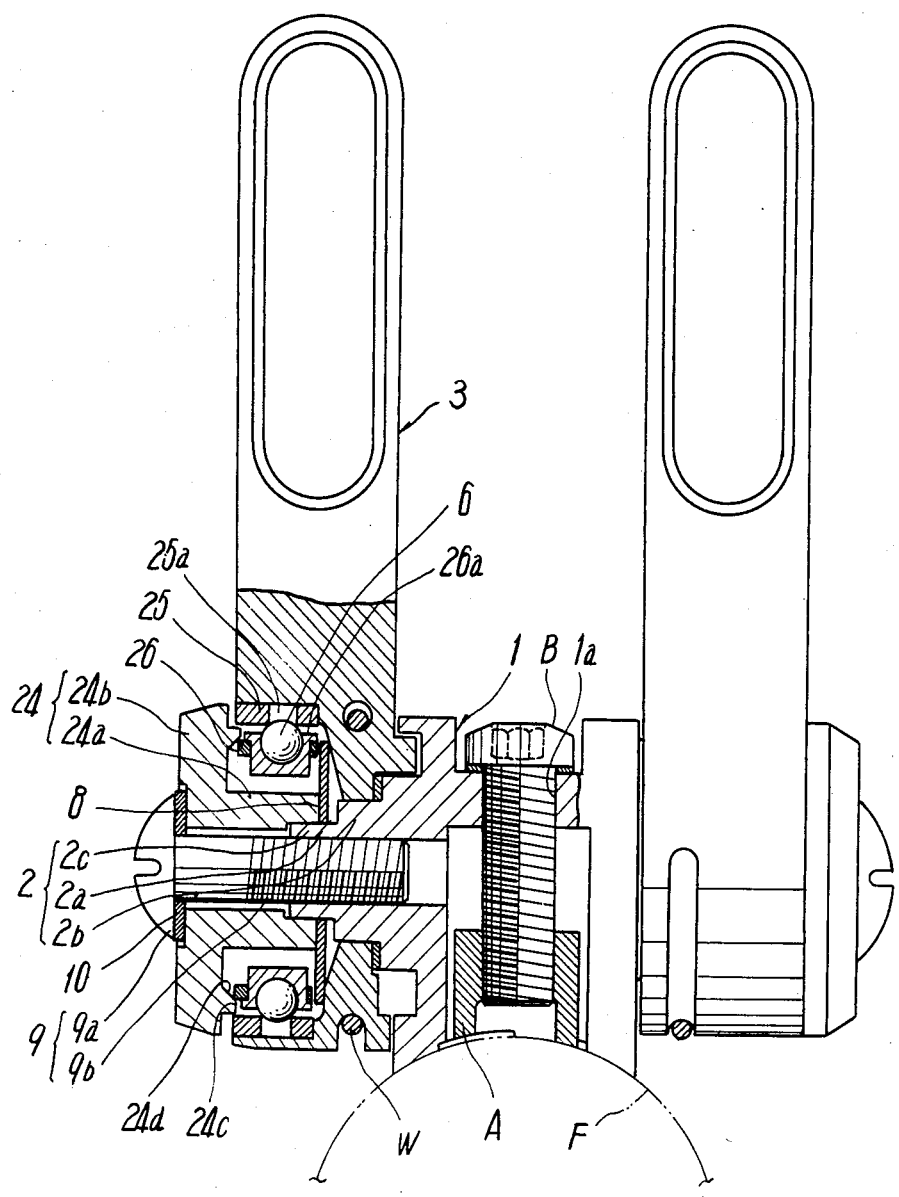
FIG. 10 is a sectional view of a fifth embodiment of the invention.

The operating member 24c integral with the cap 24, as shown in FIG. 10, has a sloped portion 24d and is adapted to enter between the positioning member 25 and the holding member 26 by means of forward screwing of adjusting screw bolt 9.

Accordingly, when the screw bolt 9 screws forward to axially move the cap 24 and to cause the operating member 24c to enter between the members 25 and 26, sloped portion 24d elastically contracts the holding member 26 in diameter, whereby the engaging members 6 cannot engage with the engaging portions 25a to lead to the non-operation of the positioning mechanism, at which time the cylinder 24a at the cap 24 urges the friction plate 8 to actuate the friction mechanism.

Hence, in this embodiment, the adjusting screw bolt 9 only is operated to enable simple, quick and alternative selection of the friction mechanism and the positioning mechanism.

Now, the fifth embodiment may be modified as a sixth embodiment as follows.

The sixth embodiment, as shown in FIGS. 12 through 14, carries out the positioning of lever 3 axially thereof by use of the position mechanism the same as in the fourth embodiment and also can alternatively switch the friction and positioning mechanisms by operating the adjusting screw bolt 9 the same as in the fifth embodiment.

A positioning member 27 in the sixth embodiment is formed in a cylinder of not-round bore, supported axially movably and not-rotatably to the not-round shaft portion 2c at the lever shaft 2, and has at the axially outside a flange 27b extending outwardly. A plurality of ratchet-teeth-like-shaped engaging portions 27a are provided at the lower surface of flange 27b, and a snap ring 28 is supported around the axial end of positioning member 27 and opposite to the flange 27b. In addition, the lever 3 in this embodiment is supported rotatably to the positioning member 27.

An engaging member 29 at the positioning mechanism is interposed rotatably and axially movably between the flange 27b and the snap ring 28. Engaging member 29 comprises an annular member 29a, a plurality of guide segments 29b disposed intermittently at the outer periphery of annular member 29a and spline-engageable axially movably with the inner surface of the recess 3d at the lever 3, the engaging projections 29c provided at the upper surface of annular member 29a opposite to the flange 27b and engageable with or disengageable from each engaging portion 27a at the positioning member 27.

The engaging member 29 is fitted onto the positioning member 27 so as to allow the projections 29c to engage with the engaging portions 27a. A plurality of leaf springs 30 for biasing the engaging member 29 in the engaging direction with the positioning member 27 are interposed between the annular member 29a and the snap ring 28, thus forming the positioning mechanism. Incidentally, the positioning member 27, engaging member 29 and leaf springs 30, can be assembled as a unit by mounting the snap ring 28. The positioning mechanism thus assembled is fitted onto the not-round shaft portion 2c of lever shaft 2, the shap ring 28 is placed on the receiving surface 3b at the recess 3d of lever 3, and the guide segments 29b are spline-fitted to the inner surfaces of recess 3d.

The operating mechanism uses a cap 31 operable in association with the adjusting screw bolt 9 the same as in the fifth embodiment, the cap 31 having a cylinder 31a not-round in section which is inserted not-rotatably into the not-round bore at the positioning member 27 and an urging portion 31c projects from the inner surface of a lid 31b.

A washer 32 formed of an elastic plate is placed on the upper end surface of positioning member 27 so that the adjusting screw bolt 9 is rotated to allow the cap 31 to move forwardly to bias the washer 32 and the guide segments 29b therewith, to thereby move the engaging member 29 to disengage from the engaging portions 27a, or the screw bolt 9 screws backwardly and the leaf springs 30 bias the engaging member 29 to return to the engaging position with the engaging portions 27a.

In addition, the relationship between the adjusting screw bolt 9 and the cap 31 is shown in FIG. 14.

In detail, the head of adjusting screw bolt 9 is provided at the rear surface with a pair of recesses 9c and 9d each i a circular arc and slopes $S_1$ are provided at both lengthwise sides of recesses 9c and 9d. The cap 31 is provided at the surface of a lid 31b with a pair of projections 31d and 31e in a circular arc corresponding to the recess 9c or 9d, the projections 31d and 31e having at both lengthwise ends thereof slopes $S_2$ respectively.

When the adjusting screw bolt 9 screws forward with respect to the lever shaft 2, the recesses 9c and 9d are fitted onto the projections 31d and 31e respectively, so that the positioning mechanism operates at the position where the fitted screw bolt 9 is operated. Thus, in this operating position, since the recesses 9c and 9d are fitted onto the projections 31d and 31e, the screw bolt 9 is prevented from being loose, a clicking vibration is given on operation of adjusting screw bolt 9, and the operating position and not-operating position of the positioning mechanism are ensured to be discriminated from each other.

When the screw bolt 9 screws further forward, the cap 31 is pressed to push the washer 32 by the urging portion 31c to disconnect the engaging member 29 from the positioning member 27 as abovementioned, and also the end face of each guide segment 29b contacts with the receiving face 3b at the recess 3d, thereby applying a desired rotational resistance to the lever 3.

Hence, also in this embodiment, the adjusting screw bolt 9 only is operated to enable the friction and positioning mechanisms to be selected simply, quickly and alternatively.

Now, each ratchet-teeth-like-shaped engaging portion 27a at the positioning member 27 preferably has a slight angle of inclination so as to reduce a resistance against disengagement of engaging member 29 when the operating lever 3 is rotated in the direction against a biasing force of the return spring at the derailleur, in comparison with that when the same is rotated in the reverse direction. Thus, the operating forces in both of the operating directions can be equalized in magnitude.

The sixth embodiment may be modified to a seventh embodiment a shown in FIGS. 15 through 25. The seventh embodiment uses no adjusting screw bolt but an operating member is provided rotatably at the screw bolt and a cam body is used to enable the selection of each mechanism i.e., the positioning mechanism or the friction mechanism.

A positioning member 33 in the seventh embodiment is cylindrical and has a flange 33b provided with engaging portions 33a. An engaging member 34 is made annular and provided at the annular portion with engaging projections 34a engageable with the engaging portions 33a at the positioning member 33 respectively and at the outer peripheral surface with splines 34b to be spline-fitted to the inner surface of a recess at the lever 3, positioning member 33 and engaging member 34, the same as in the sixth embodiment, are assembled as a unit by use of leaf springs 30 secured by a snap ring 28.

Also, a fixing bushing 35 is applied to the positioning member 33 and a fixing screw member 36' to be discussed below, screws with the threaded bore 2a at the lever shaft 2, thereby fixing the positioning member 33 to the base member 1, the screw member 36 also being screwably fixed thereto.

The bushing 35 has at the outer periphery a round peripheral portion and a not-round peripheral portion, the round peripheral portion carrying rotatably an operating member 37 having a first cam face 37a, the not-round peripheral portion carrying not-rotatably but axially movably only a cam body 38 having a second cam face 38a and a washer 39 of an elastic plate.

At the flange 33b of positioning member 33 is provided a release pin 40 passing through flange 33b and abutting at one end against the washer 39 and at the other end against the engaging member 34, the cam body 38 and washer 39 being restrained elastically by the springs 30 from moving in one axial direction. In addition, a contact member 41 to contact with the washer 39 and apply a rotational resistance to the lever 3 is mounted to the lever 3 rotatably not relative thereto. The washer 39 serves as a friction plate and constitutes together with the contact member 41 a friction mechanism. Alternatively, the contact member 41 may be integral with the lever 3.

Also, the bushing 35 is attached with a snap ring 42 and supports, together with the snap ring 28 mounted to the positioning member 33, the positioning mechanism as a unit.

The fixing screw member 36 is provided at the outer periphery of the head 36a circumferentially with splines 36b extending axially of the screw member 36 and with an annular groove 36c traversing the splines 36b, the head 36a being housed in a recess 37b at the top of operating member 37 and rotatable relative thereto.

At the top of operating member 37 are provided two lateral bores 37c passing through the top and communicating with the recess 37b, and a handle 43 of about C-like shape is fitted at both ends into the bores 37c and provided at both ends with engaging projections 43a selectively engageable with the splines 36b or the annular groove 36c, whereby the projections 43a engage with the splines 36b to restrain the operating member 37 from rotation with respect to the fixing screw member 36, or engage with the annular groove 36c to allow the operating member 37 to rotate with respect to the same.

Figure 15:
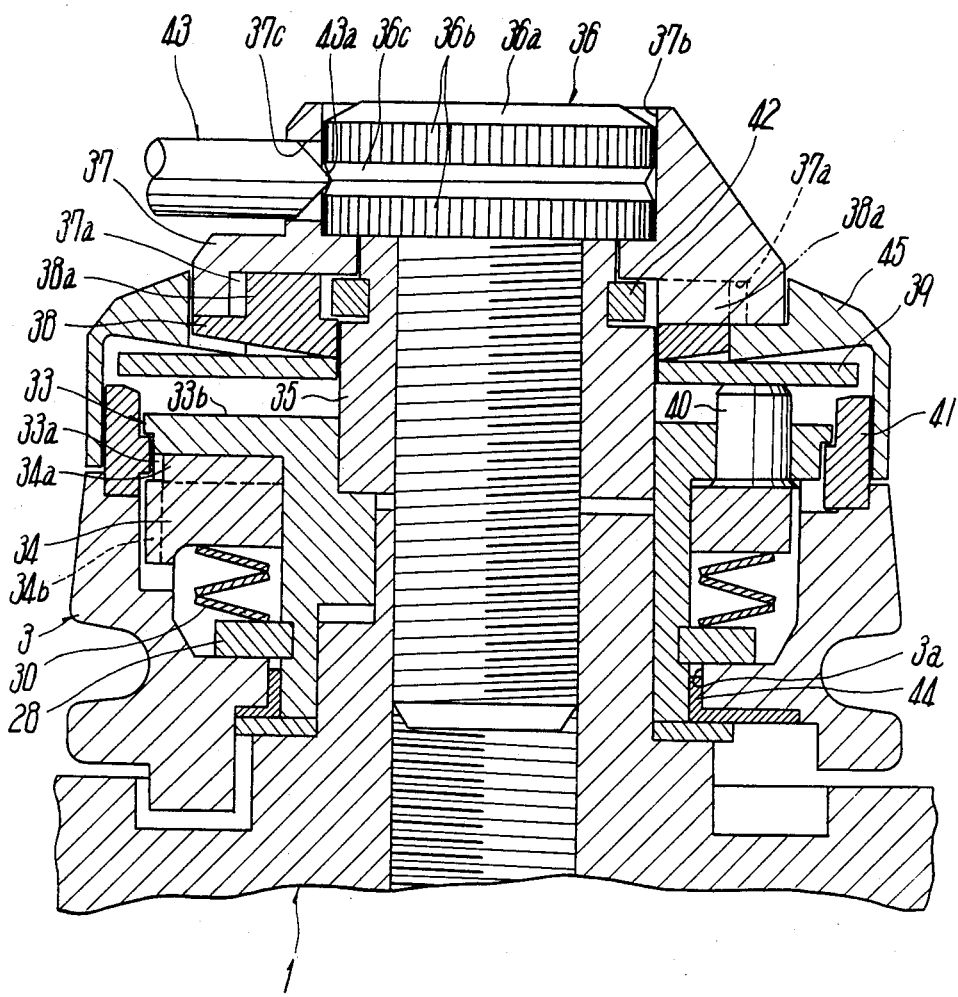
FIG. 15 is a sectional view of the principal portion only at a seventh embodiment of the invention.
Figure 16:
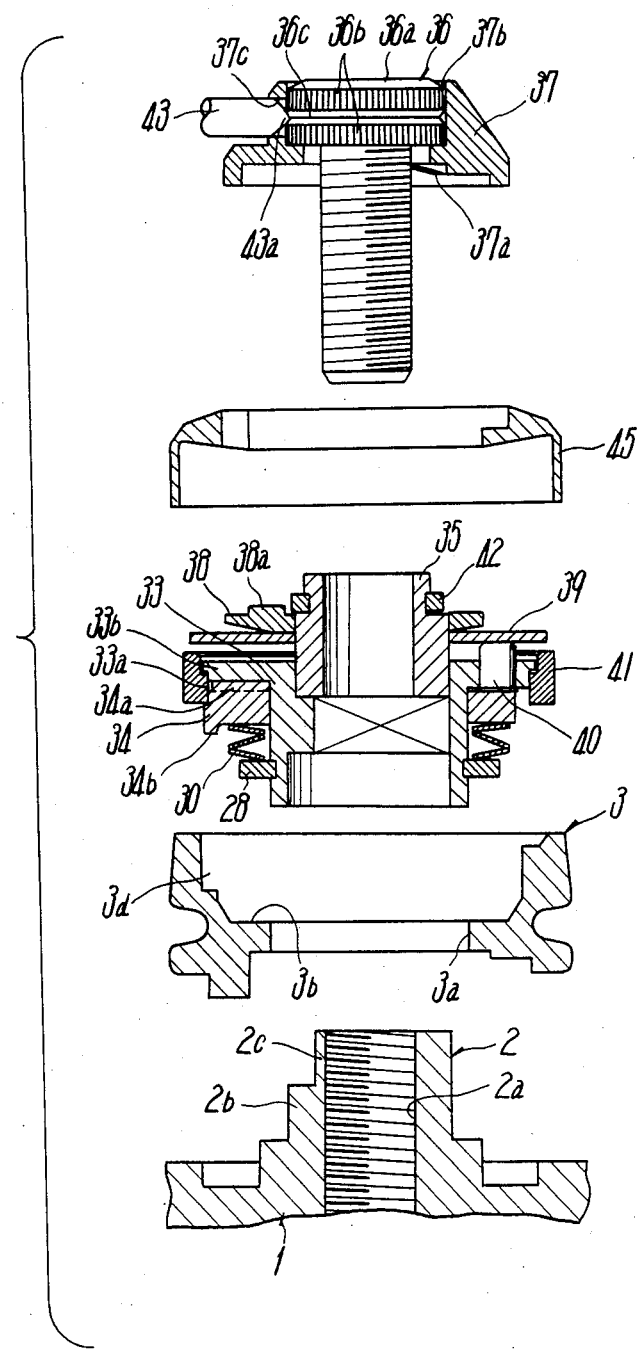
FIG. 16 is a sectional exploded view of the seventh embodiment.
Figure 17:
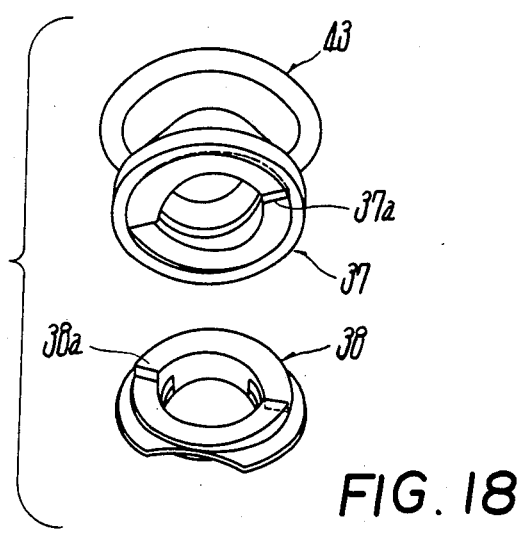
FIG. 17 is a perspective view of an operating member and a cam body only in the seventh embodiment.
Figure 19:
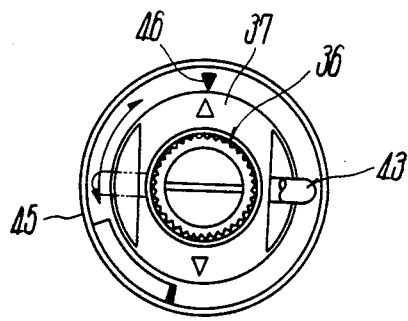
FIG. 19 is a partially omitted plan view of both the operating member and the cam body.

Incidentally, in FIG. 15, reference numeral 44 designates a flanged washer of a ring-like shape for reinforcing the shaft bore 3a, and 45 designates a cap, so that display means 46 for displaying the operating position of operating member 37 are provided at the surfaces of the cap 45 and operating member 37 respectively as shown in FIG. 19.

In the abovementioned construction, the handle 43 operates to rotate the operating member 37 to thereby selectively actuate the positioning mechanism and friction mechanism and the operating condition thereof is held reliably by engagement of handle 43 with the head 36a at the fixing screw member 36.

Referring to FIG. 15, the positioning mechanism is shown in its operating condition. In a case where the lever 3 is intended to be switched from the above condition to the operating condition of the friction mechanism, the handle 43 at first is raised with respect to the fixing screw member 36 and engages at the engaging projections 43a with the annular groove 36c as shown in FIG. 15, thereby making the operating member 37 rotatable. In this stage, the operating member 37 is rotated in the reverse direction (in the direction of the arrow in FIG. 18) to that of tightening the fixing screw member 36, whereby first and second cam faces 37a and 38a shift each other and successively from the engaging position shown in FIG. 18 and the cam body 38 shifts in the disengaging direction from the operating member 37. Such movement of cam body 38 is transmitted to the engaging member 34 through the washer 39 and release pin 40, so that the engaging member 34 moves against the springs 30 and disengages from the engaging portion 33a at the positioning member 33, thereby not actuating the positioning mechanism. The displacement of cam body 38 brings the washer 39 into press-contact at the inner surface of the peripheral portion thereof with the contact member 41 rotatable together with the operating lever 3, so that a predetermined frictional force is provided between the contact member 41 and the washer 39 to actuate the friction mechanism. Hence, the lever 3 is operable by actuating the friction mechanism. At this time, the handle 43 engages at the engaging projections 43a thereof with the splines 36b, thereby ensuring that the operating member 37 is held in its operating position.

Figure 18:
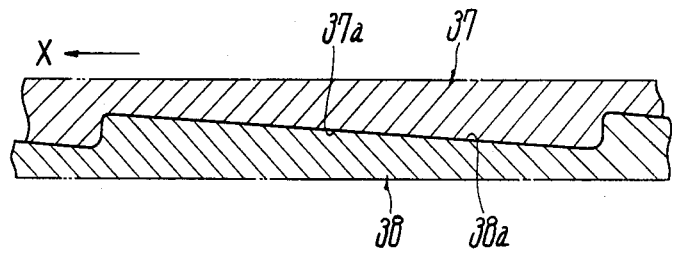
FIG. 18 is an illustration of an engaging relationship between the operating member and the cam body.
Figure 20:
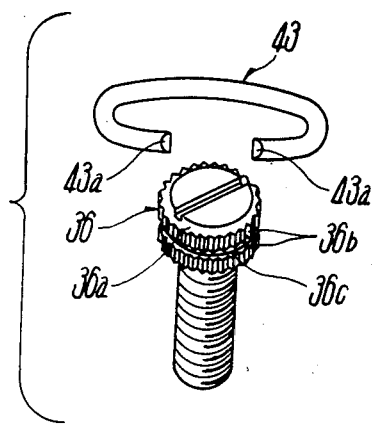
FIG. 20 is a perspective view of a fixing screw member and a handle in the seventh embodiment.
Figure 21:
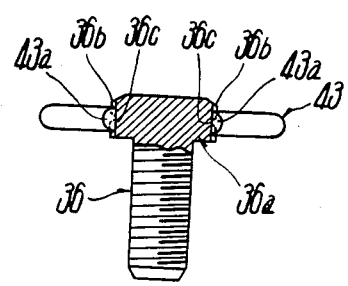
FIG. 21 is an illustration of a relationship between the fixing screw member and the handle at the same.
Figure 22:
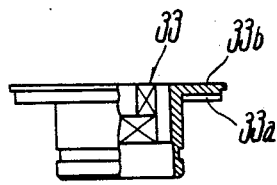
FIG. 22 is a partially sectional view of a positioning member only in the same.
Figure 23:
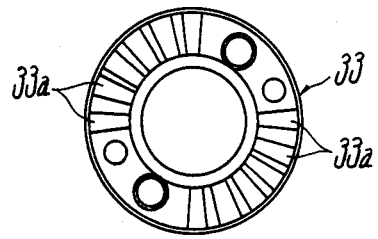
FIG. 23 is a bottom view of the positioning member only in FIG. 22.
Figure 24:
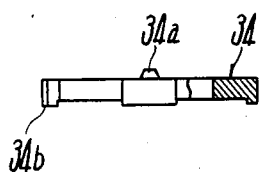
FIG. 24 is a partially sectional view of an engaging member only at the seventh embodiment.
Figure 25:
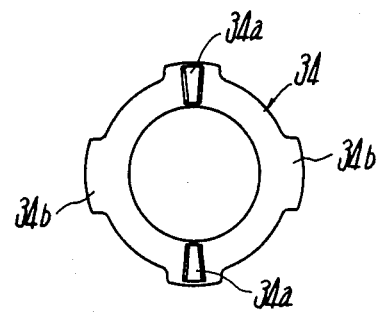
FIG. 25 is a plan view of the engaging member in FIG. 24, and FIGS. 26 and 27 are sectional views of further modified embodiments of the invention.

In a case where the friction mechanism in operation is switched to the positioning mechanism in operation, the engaging projections 43a engage with the annular groove 36c at the fixing screw 36 and the operating member 37 is rotated in the direction of screwing forward the screw 36, so that the first and second cam faces 37a and 38a restore as shown in FIG. 18. Hence, the cam body 38 moves toward the operating member 37 and the engaging member 34 engages at the portions 34a with the engaging portion 33a, thereby putting the positioning mechanism in its operating mode.

Alternatively, the cam body 38 may be eliminated and the operating member 37 may screw with the outer periphery of fixing bushing 35 so as to screw forwardly or backwardly to selectively switch the positioning and the friction mechanisms. Such construction is not particularly defined.

Also, the lever shaft 2 may extend and the bushing 35 may pass therethrough so that, for example, a nut may screw with, or a snap ring be mounted to, the extension of lever shaft 2.

Figure 26:
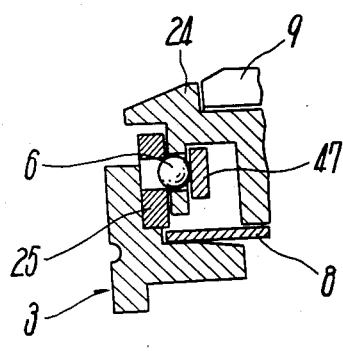
Figure 27:
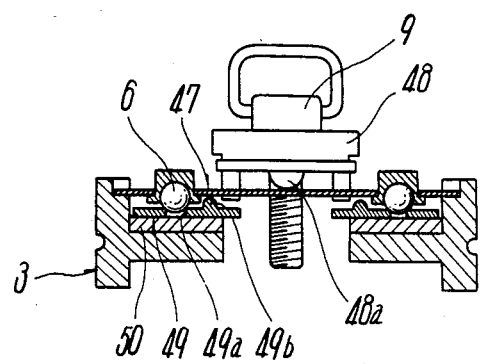

As a modification of the fifth embodiment, the operating member 24c at the cap 24, as shown in FIG. 26, extends to serve as a holding member for holding the engaging members 6, in which an elastic cylinder 47 is used to bias the engaging members 6 toward the positioning member 25. Alternatively, a holding member 47 holding the engaging members 6 may, as shown in FIG. 27, be formed of an elastic plate and engage with the lever 3 in relation of being not-rotatable relative thereto. A biasing member 48 in association with screwable movement of adjusting screw member 9 may be provided and have a projection 48a in contact with the holding member 47. A positioning member 49 may be disc-like-shaped, supported not rotatably but axially movably only to the lever shaft 2 or base member 1, and provided with receiving members 49b, so that the screw member 9 may screw forward to elastically displace the holding member 47 to disengage the engaging members 6 from the engaging portions 49a and the positioning member 49 is brought into press-contact with the lever 3 through the friction plate 50, thereby giving to the lever 3 the desired rotational resistance.

Although the invention has been described with reference to several different embodiments, these embodiments are merely exemplary and not limiting of the invention which is defined solely by the appended claims.

What is claimed is:

1. A speed-change operating device adapted to switch a derailleur from one to another of plural speed stages of a bicycle, said derailleur having a return spring for returning the derailleur to a rest position, said speed-change operating device comprising:
   a base member adapted to be supported on said bicycle, said base member having a lever shaft,
   an operating lever rotatably supported on said lever shaft and adapted to actuate said derailleur,
   a friction mechanism for applying to said lever a rotational resistance adapted to overcome a bias supplied by said return spring of said derailleur,
   a positioning mechanism for positioning said lever at one of said plural speed change stages, said positioning mechanism including a positioning member having a plurality of engaging portions oriented substantially on a circle centered around said lever shaft and an engaging member engageable with at least one of said engaging portions, and
   an operating mechanism to select between an operating mode and a non-operating mode for said positioning mechanism for positioning said operating lever, wherein one of said positioning member and said engaging member is engageable with said operating lever, the other of said positioning member and said engaging member is fixed relative to said base member, said operating mechanism including a clutch member for selectively engaging and disengaging said one of said positioning member and said engaging member with said operating lever.

2. A speed-change operating device as in claim 1, wherein said operating lever has a boss with a round recess, said positioning member is cylindrical in shape and is positioned within said round recess, said positioning member has an engaging groove engageable with said clutch member, said clutch member being supported to said operating lever and movable to an engaging position at which said clutch member engages with said engaging groove and a disengaging position at which said clutch is disengaged from said engaging groove.

3. A speed-change operating device as in claim 1, wherein said engaging member is engageable with said operating lever, said positioning member is fixed relative to said base member, and said clutch member is for selectively engaging and disengaging said engaging member with said operating lever.

4. A speed-change operating device as in claim 3, further comprising a cylindrical holding member holding said engaging member, said holding member having an engaging groove engageable with said clutch member, said clutch member being supported to said operating lever and movable to an engaging position at which said clutch member engages with said engaging groove of said holding member and a disengaging position at which said clutch member is disengaged from said engaging groove.

5. A speed-change operating device as in claim 1, wherein said positioning member is engageable with said operating lever, said engaging member is fixed relative to said base member, and said clutch member is for selectively engaging and disengaging said positioning member with said operating lever.

* * * * *